March 10, 1970   S. H. COTTON, JR., ET AL   3,499,240
ILLUMINATED GRID FOR BACKLIGHTED PLOTTING BOARDS
Filed Feb. 21, 1967
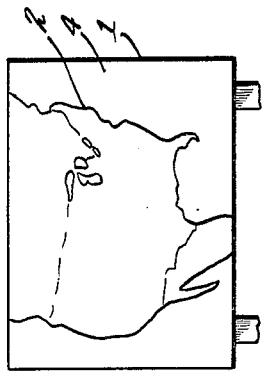
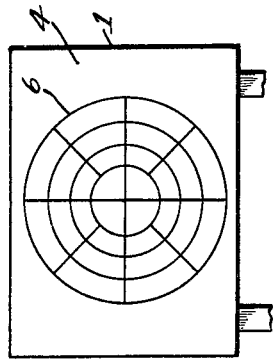
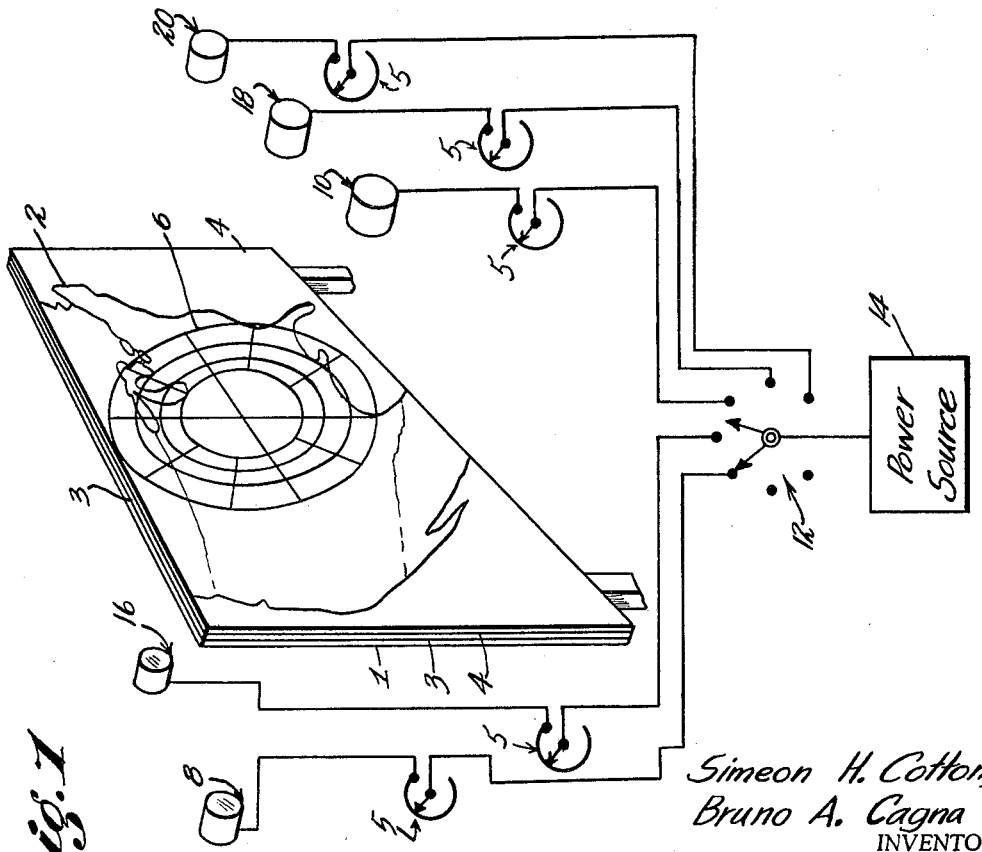
Simeon H. Cotton, Jr.
Bruno A. Cagna
INVENTORS
BY 3,499,240
ILLUMINATED GRID FOR BACKLIGHTED
PLOTTING BOARDS
Simeon H. Cotton, Jr., Springfield, Va., and Bruno A.
Cagna, Winter Park, Fla., assignors, by mesne assignments, to the United States of America as represented
by the Secretary of the Navy
Filed Feb. 21, 1967, Ser. No. 618,297
Int. Cl. G09f 13/02, 13/04
U.S. Cl. 40—130     3 Claims

ABSTRACT OF THE DISCLOSURE

Light sources of different frequencies are alternatively directed from back and/or front of a multilayered display wherein the front translucent layer or layers bear indicia sensitive to light of different frequencies so that information on different layers is made visible selectively by selecting front or back lighting of appropriate frequency.

BACKGROUND OF THE INVENTION

The invention is in the field of display devices. In the prior display art the information on a display, for example on a blackboard or chart stand has been changed by erasing and rewriting or by physically replacing one chart with another. The long standing problem of rapidly changing display information has recently become critical in many fields, for example in teaching, because of an exploding technology. This invention solves this urgent problem.

SUMMARY OF THE INVENTION

A backlighted plotting board or other display is covered with a translucent material having information inscribed thereon in paints which are sensitive to different frequencies of light. When the plotting board is backlighted with natural light the information thereon is visible through the translucent material and paints which are not sensitive to natural light. When the back lighting is removed and light of different frequency, for example in the ultra violet range of frequencies, is directed to the front of the display the information on the plotting board disappears and that on the translucent material becomes visible.

BRIEF DESCRIPTION OF THE DRAWINGS

FIG. 1 shows a multilayered chart board having front and backlighting means.

FIG. 2 shows the information visible when chartboard 1 is backlighted.

FIG. 3 shows the information visible when chartboard 1 is front lighted.

DESCRIPTION OF THE PREFERRED EMBODIMENT

The invention as shown in FIG. 1 comprises a transparent or translucent chart board 1 bearing information such as a map 2 shown here as an outline. Chart board 1 is covered by a translucent overlay 4 on which is fixed any desired information, for example the polar grid 6 shown. A light source 8 which may be an incandescent lamp is provided for back lighting chart board 1. A front lighting source 10 is provided for lighting chart board 1. A switch 12 is provided for selectively connecting back light 8 or front light 10 to a power source 14. Ground connections are not shown. A light intensity varying means such as 5 may be provided for each light source. An additional back light 16 and additional front lights 18 and 20 may be provided for purposes which will be described hereinafter.

In operation, switch 12 may be operated to activate back light 8, whereupon only the information on chart board 1, outline map 2 as shown in FIG. 2, is visible to observers looking at chart board 1 from the front. When it is desired to change the information on chart board 1, switch 12 is operated to extinguish back light 8 and activate front light 10, whereupon the outline map 2 disappears and the information on overlay 4, the polar grid 6, becomes clearly visible as shown in FIG. 3.

The above described changing of displayed information by operation of a switch is accomplished by using paints or inks to inscribe information on chart board 1 and overlay 4 which are prominently visible in light of different frequencies. For example, chart board 1 may be a standard back lighted chart board on which any information becomes clearly visible when back light 8 is activated. Information is imprinted on overlay 4 using fluorescent paints which become highly visible when illuminated by light of a frequency different from that of back light 8 for example front light 10 which produces ultra-violet light. In the disclosed embodiment overlay 4 comprises a translucent sheet of polyethylene with a matte surface on one side. Many other materials of suitable translucency or transparency could be used. The polar grid 6 was imprinted on overlay 4 using invisible red pigmented color flat finish fluorescent lacquer. A background coat of invisible green pigmented color flat finish fluorescent lacquer was then applied. When desired, depending on ambient lighting conditions, thickness of the fluorescent paints used, prominence of the chart board information, etc., an additional coat such as white lacquer can be applied to overlay 4 to further suppress the visibility of the information on chart board 1 when the assembly is front lighted. The fluorescent paints used in this particular embodiment are commercially available, from, for example, Shannon Luminous Materials Co., Hollywood, Calif.

An additional layer or overlay 3, additional backlight 16 and additional front lights 18 and 20 are shown in FIG. 1 to illustrate that the invention is not limited to a single overlay and single back light and front light sources. For example additional overlay 3 may be imprinted with different information using materials which fluoresce under light of still other frequencies which might be provided by light sources 18 and/or 20. Further, two or more poles on switch 12 could be moved to selectively operate several lights simultaneously. Light intensity control means 5 which may be a well known device such as a solid state control or a rheostat may be operated to obtain optimum lighting for varying the visibility of selected indicia under various conditions of ambient lighting. Ambient lighting may be controlled by well known expedients for maximum effect. The disclosed embodiment is most effective in a low ambient lighting environment. The number of combinations and permutations available for switching information on a chart board so that unwanted information is suppressed or subdued when the display is switched to make other information prominently visible, as for example, by an instructor during the course of a lecture, is limited only by the number of different light sensitive materials and the number of light sources of different frequencies available. Many arrangements will suggest themselves to those skilled in the art, it should therefore be understood that the invention is not limited to the specific embodiment shown.

What is claimed is:

1. A backlighted light transmitting chart board, information bearing removable overlay means affixed to the face of said chart board, back lighting means for said chart board, front lighting means for said chart board, switch means for selectivley operating said back lighting means and/or said front lighting means whereby information on said chard board or on said overlay means may be selectively displayed by controlling said switch means to selectively operate said back lighting means or said front lighting means, and wherein said front lighting means comprise a light source or sources of different frequency or frequencies from said back lighting means, said information on said chart board and on said overlay means being respectively responsive to light of different frequencies, and wherein said overlay means may comprise more than one information bearing layer, said information bearing layers being respectively responsive to light of different frequencies.

2. The apparatus of claim 1 wherein the overlay means comprise a translucent sheet imprinted with fluorescent paints responsive to said front lighting means.

3. The apparatus of claim 1 wherein said switch means are selectively operable to activate one or several of said front and/or back lighting means and light intensity varying means are provided for varying the intensity of each of said lighting means.

References Cited
UNITED STATES PATENTS

| | | |
|---|---|---|
| 2,020,087 | 11/1935 | Treshansky et al. |
| 2,015,170 | 9/1935 | Ward. |
| 3,163,554 | 12/1964 | Gessler. |

FOREIGN PATENTS

| | | |
|---|---|---|
| 698,785 | 10/1953 | Great Britain. |

EUGENE R. CAPOZIO, Primary Examiner

R. CARTER, Assistant Examiner